(12) United States Patent
Viikki et al.

(10) Patent No.: US 7,392,184 B2
(45) Date of Patent: Jun. 24, 2008

(54) ARRANGEMENT OF SPEAKER-INDEPENDENT SPEECH RECOGNITION

(75) Inventors: Olli Viikki, Tampere (FI); Kari Laurila, Tokyo (JP)

(73) Assignee: Nokia Corporation, Espoo (FI)

( * ) Notice: Subject to any disclaimer, the term of this patent is extended or adjusted under 35 U.S.C. 154(b) by 470 days.

(21) Appl. No.: 10/122,730

(22) Filed: Apr. 15, 2002

(65) Prior Publication Data

US 2002/0152067 A1    Oct. 17, 2002

(30) Foreign Application Priority Data

Apr. 17, 2001    (FI) .................................. 20010792

(51) Int. Cl.
*G10L 15/08*    (2006.01)

(52) U.S. Cl. ...................... 704/236; 704/243; 704/255

(58) Field of Classification Search ................ 704/256, 704/277, 260, 258, 207, 8, 9, 270, 1, 5, 7, 704/236, 250, 243, 244, 231, 246; 709/203, 709/260
See application file for complete search history.

(56) References Cited

U.S. PATENT DOCUMENTS

| | | | | |
|---|---|---|---|---|
| 5,165,095 | A | | 11/1992 | Borcherding ................ 379/88 |
| 5,673,362 | A | * | 9/1997 | Matsumoto ................. 704/260 |
| 5,940,795 | A | * | 8/1999 | Matsumoto ................. 704/258 |
| 5,940,796 | A | * | 8/1999 | Matsumoto ................. 704/260 |
| 5,950,163 | A | * | 9/1999 | Matsumoto ................. 704/260 |
| 6,041,300 | A | | 3/2000 | Ittycheriah et al. ......... 704/255 |
| 6,098,041 | A | * | 8/2000 | Matsumoto ................. 704/260 |
| 6,128,482 | A | | 10/2000 | Nixon et al. ................. 455/414 |
| 6,141,642 | A | * | 10/2000 | Oh ............................. 704/260 |
| 6,208,964 | B1 | | 3/2001 | Sabourin .................... 704/244 |
| 6,272,456 | B1 | * | 8/2001 | de Campos ................... 704/8 |
| 6,385,586 | B1 | * | 5/2002 | Dietz ......................... 704/277 |
| 6,463,413 | B1 | * | 10/2002 | Applebaum et al. ........ 704/256 |
| 6,557,026 | B1 | * | 4/2003 | Stephens, Jr. .............. 709/203 |
| 6,625,576 | B2 | * | 9/2003 | Kochanski et al. ......... 704/260 |

FOREIGN PATENT DOCUMENTS

| | | |
|---|---|---|
| DE | 4443226 A1 | 6/1995 |
| DE | 19751123 C1 | 6/1999 |

(Continued)

OTHER PUBLICATIONS

"Self-Organizing Letter Code-Book For Text-To-Phoneme Neural Network Model", Kare Jean Jensen et al., 6th International Conference on spoken Language Processing (ICSLP), 2000.

(Continued)

*Primary Examiner*—Huyen X. Vo
(74) *Attorney, Agent, or Firm*—Perman & Green, LLP

(57) ABSTRACT

A method needed in speech recognition for forming a pronunciation model in a telecommunications system comprising at least one portable electronic device and server. The electronic device is arranged to compare the user's speech information with pronunciation models comprising acoustic units and stored in the electronic device. A character sequence is transferred from the electronic device to the server. In the server, the character device is converted into a sequence of acoustic units. A sequence of acoustic units is sent from the server to the electronic device.

13 Claims, 3 Drawing Sheets

FOREIGN PATENT DOCUMENTS

| | | |
|---|---|---|
| EP | 0 690 398 B1 | 1/1996 |
| EP | 1047046 A2 | 10/2000 |
| EP | 1074973 A2 | 2/2001 |
| GB | 2338369 A | 12/1999 |
| WO | WO 99/26232 | 5/1999 |
| WO | WO 00/65807 | 11/2000 |

OTHER PUBLICATIONS

"Decision Tree Based Text-To-Phoneme Mapping For Speech Recognition", Suontausta et al.

"The GSM System For Mobile Communications", Mouly et al., 1992, Chapter 8.3, pp. 556-565.

Chinese Office Action Aug. 6, 2004.

\* cited by examiner

ARRANGEMENT OF SPEAKER-INDEPENDENT SPEECH RECOGNITION

BACKGROUND OF THE INVENTION

The invention relates to speaker-independent speech recognition in a telecommunications system, and particularly to pronunciation modelling for speech recognition.

Different speech recognition applications have been developed during the recent years for instance for car user interfaces and mobile stations. Known methods for mobile stations include methods for calling a particular person by saying aloud his/her name to the microphone of the mobile station and by setting up a call to the number according to the name said by the user. However, present methods usually require that the mobile station or the system in a network be trained to recognize the pronunciation for each name. Speaker-independent speech recognition improves the usability of a speech-controlled user interface, because this training stage can be omitted. In speaker-independent name selection, the pronunciation can be modelled for the names in the contact information, and the name spoken by the user can be compared with the defined pronunciation model, such as a phoneme sequence.

A plurality of methods for speaker-independent speech recognition are known, by means of which the modelling of the pronunciation can be performed. Phoneme lexicons, for example, can be used for this purpose. One method based on phoneme lexicons is disclosed in WO 9 926 232. However, phoneme lexicons are so large in size that the memory capacity of the present mobile stations is insufficient. Further problems are caused by names and words not found in the lexicon. Different statistical methods, such as neural networks and decision trees, allow smaller memory consumption. Although a more accurate result can be achieved with decision trees than with neural networks requiring less memory space, both methods are lossy. The accuracy of the modelling is thus reduced, which degrades the performance of speech recognition accuracy. Thus, a compromise must be made as regards accuracy and memory consumption. Despite the high compression degree, the memory requirement of decision trees and neural networks remains rather high. Typically, a modelling system based on a decision tree requires about 100 to 250 kB of memory per modelled language, which can be too much when implementing mobile stations. Another option is to send an audio signal formed of the user's speech to a network and to perform the speech recognition in the network. Performing speech recognition in a network requires a connection to be set up to a service, which causes undue delay, and interference on the radio path decreases the prospects of succeeding.

BRIEF DESCRIPTION OF THE INVENTION

An object of the invention is thus to provide a method and an apparatus implementing the method which allow accurate pronunciation modelling and alleviate the above problems. The objects of the invention are achieved with a method, telecommunications system, electronic device, server, computer program product and data medium characterized by what is stated in the independent claims. Preferred embodiments of the invention are disclosed in the dependent claims.

The invention is based on the idea that the pronunciation modelling for a portable electronic device is performed in a separate server device. Hence, the character sequence intended for speech recognition is sent from an electronic device to a server which has more memory capacity available than the electronic device. The character sequence is converted in the server into at least one sequence of acoustic units. The sequence of acoustic units is sent from the server to the electronic device to be used in speech recognition. Any data processing device comprising telecommunication means can function as the server, the data processing device being arranged to perform a conversion into a sequence of acoustic units for character sequences received from one or more electronic devices. A character sequence refers to any combination of characters. Typically, it is a letter sequence but there can also be punctuation marks (e.g. comma or space character). A character sequence can also consist of figure-like characters used mostly in Asian languages. Acoustic units include any acoustic events, for instance 20 ms speech sample, syllable, phoneme or part of a phoneme. Typically, devices performing speech recognition divide the phoneme into three parts (beginning, middle, end), on the basis of which comparison with the speech information can be performed. It is to be noted that a phoneme can also refer to a phoneme cluster (pronunciation forms can be very close to each other in different languages).

Since the server has essentially more memory capacity available than the electronic device, there is no need to compromise over the accuracy of the pronunciation modelling in the solution according to the invention. Since there are no memory restrictions, it is also possible to support more languages than in modelling implemented in an electronic device.

According to a preferred embodiment of the invention, the character sequence received from the electronic device is used as the basis of the search of information related to said sequence, for example telephone numbers. The information, in addition to the sequence of acoustic units, is sent to the electronic device. This is advantageous for the user, since the additional information relating to the character sequence can easily be provided for use in the electronic device.

According to another preferred embodiment of the invention, an audio model is formed of a sequence of acoustic units in an audio synthesizer. The audio model is stored in the electronic device, associating it to the character sequence or its tag. The audio model is repeated to the user of the electronic device at least as a response to the user's speech command being substantially corresponding to the sequence of acoustic units received from the character sequence. This improves usability, because the user also receives audio feedback relating to the character sequence.

BRIEF DESCRIPTION OF THE DRAWINGS

The invention will now be described in more detail in connection with preferred embodiments, with reference to the attached drawings, of which.

DETAILED DESCRIPTION OF THE INVENTION

The invention can be applied to any telecommunications system which comprises an electronic device comprising a speech recognition application, and a server, between which data can be transmitted. In the following, use of phoneme sequences as pronunciation models is described, without, however, confining the invention thereto.

Figure 1A:
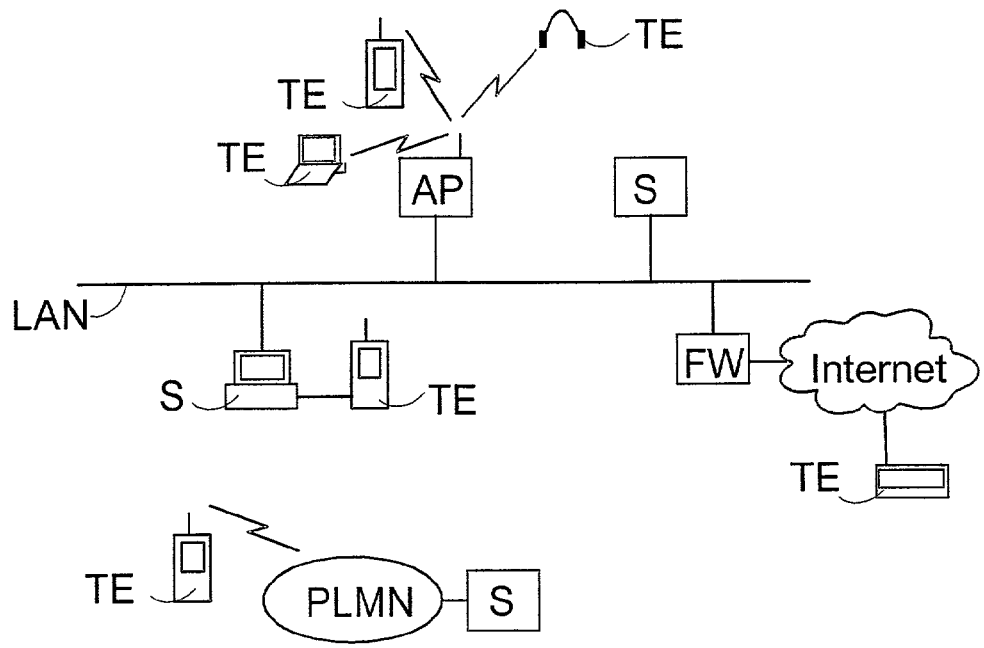
FIG. 1a shows a block diagram of a telecommunications system to which the invention can be applied.

FIG. 1a shows a few different examples to which the invention can be applied. An electronic device TE connected to a local area network LAN comprises data transmission means and software controlling the data transmission to communicate with devices in the network LAN. The TE can comprise a network interface card of a wireless local area network, the card being based on one of the IEEE802.11 standards or on the standard of the BRAN (Broadband Radio Access Networks) standardization project. The electronic device TE can be connected to a local area network LAN and further to server S via an access point AP or via the Internet and firewall FW. The TE can also communicate directly with the server S, for instance using a cable, infrared or a data transmission solution functioning at radio frequencies, for example a Bluetooth transceiver. As illustrated in FIG. 1a, the TE can be any portable electronic device, in which speech recognition is performed, for example a PDA device, remote controller or a combination of an earpiece and a microphone. The TE can be a supplementary device used by a computer or a mobile station, in which case the data transmission to the server S can be arranged via a computer or a mobile station.

In accordance with a preferred embodiment of the invention, the TE is a mobile station communicating with a public land mobile network PLMN, to which also the server S is functionally connected, for instance via the Internet. The electronic device TE connected to the network PLMN comprises mobile station functionality for communicating with the network PLMN wirelessly. The mobile network PLMN can be any known wireless network, for instance a network supporting the GSM service, a network supporting the GPRS (General Packet Radio Service), or a third generation mobile network, such the UMTS (Universal Mobile Telecommunications System) network according to the 3GPP ($3^{rd}$ Generation Partnership Project) standard. The functionality of the server S can also be implemented in the mobile network PLMN. The electronic device TE can be a mobile phone used for speaking only, or it can also contain PDA (Personal Digital Assistant) functionality.

Figure 1B:
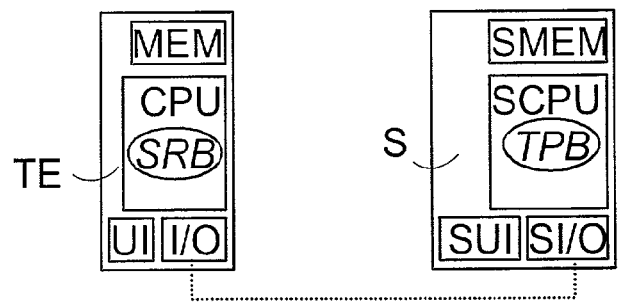
FIG. 1b shows a block diagram of an electronic device and a server.
Figure 2:
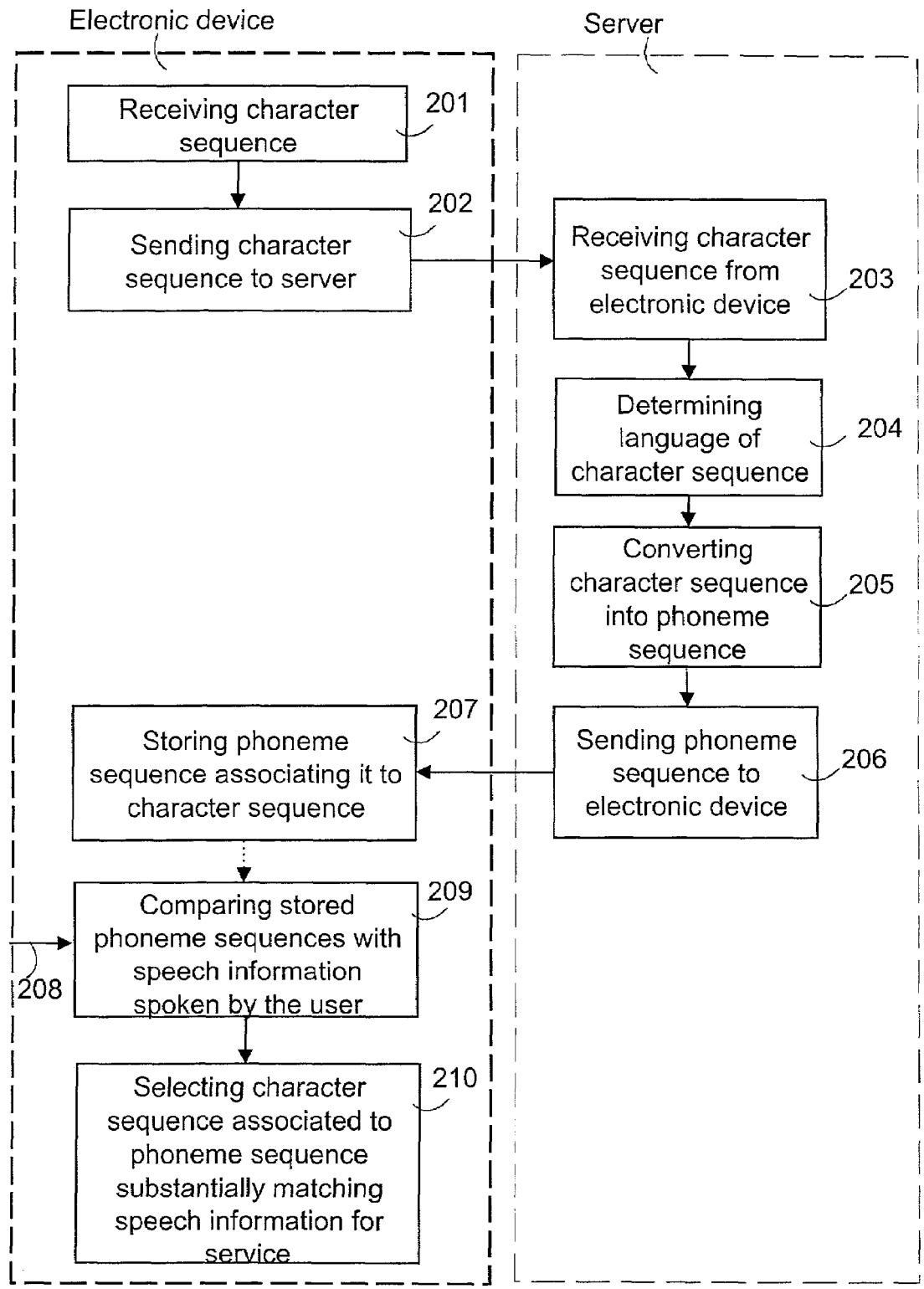
FIG. 2 shows a flow chart of a method according to a first preferred embodiment of the invention.
Figure 3:
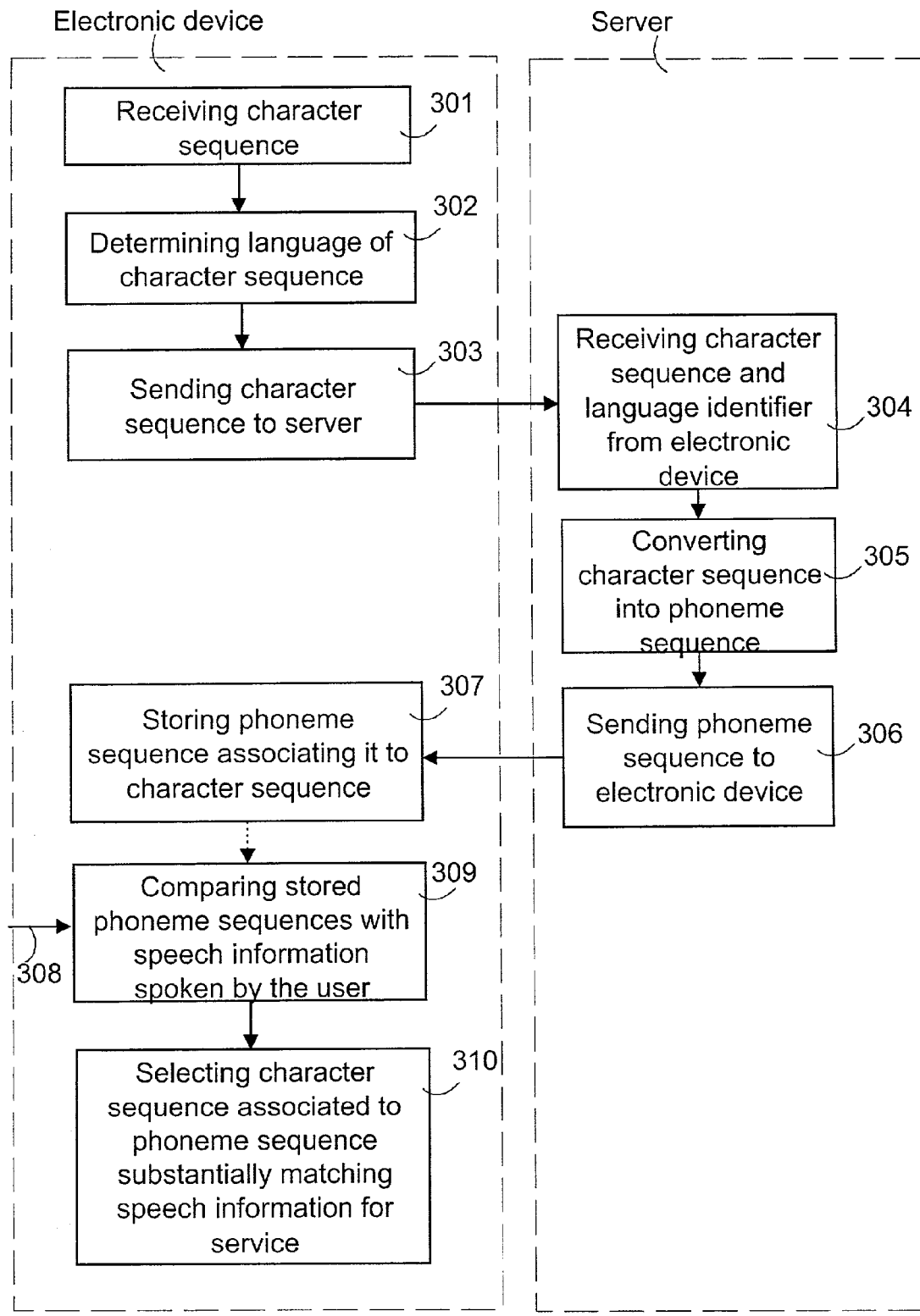
FIG. 3 shows a flow chart of a method according to a second preferred embodiment of the invention.

As illustrated in FIG. 1b, the electronic device TE (in wired networks LAN and in wireless networks PLMN) and the server S comprise memory MEM; SMEM, a user interface UI; SUI, I/O means I/O; SI/O for arranging data transmission between the S and the TE directly or via a network (PLMN, LAN, Internet), and a central processing unit CPU; SCPU comprising one or more processors. The memory MEM; SMEM contains a non-volatile part for storing the applications controlling the central processing unit CPU; SCPU, and a random access memory to be used for data processing. A speech recognition block SRB is preferably implemented by executing in the CPU a computer program code stored in the memory MEM. The server S provides a text-to-phoneme conversion block TPB, preferably by executing in the SCPU a computer program code stored in the memory SMEM. The computer program code executed in the central processing units CPU and SCPU causes the electronic device TE and the server S to carry out the inventive features, some embodiments of which are illustrated in FIGS. 2 and 3. The computer programs can be received via a network and/or be stored in memory means, for instance on a disk, a CD-ROM disk or other external memory means, from where they can be loaded into the memory MEM, SMEM. Integrated circuits can also be used to implement the SRB and TPB.

FIG. 2 shows a method according to a first preferred embodiment of the invention, in which the text phoneme block TPB implemented by the server S also comprises a language selector, i.e. a language selection algorithm. The TE receives 201 a character sequence typically via a user interface UI. The character sequence is generally one fed by the user, for example a proper name to be added to the contact details. It is also possible that some application executed in the electronic device TE produces 201 a character sequence, for instance a control command string, the user being able to control the application later by saying the sequence. Using I/O means I/O, the TE (SRB) sends 202 the character sequence to the server S, in which the sequence is received 203 by means of means SI/O. The required identification information of the server S, for instance an ISDN-based number or an IP address, at which the TE directs the character sequence, has been stored in advance in the memory MEM of the electronic device TE. If the server S is in a mobile network PLMN, the PLMN operator, for instance, may have stored the identification information on an IC card, from where it can be retrieved.

The text-to-phoneme conversion block TPB of the server S comprises a language selector, which determines 204 the language of the character sequence. The language can be determined for example by using what are called N grams (combinations with letter N) or on the basis of the occurrence probability of short words. The language can also be determined by means of decision trees: on the basis of lexicons in different languages, character-specific decision trees are taught, which express the probability of at least one language on the basis of the character environment of each character. These decision trees are stored in the server S (in the memory SMEM). Decision trees are examined character by character for the received character sequence, after which the language is determined for the character sequence. It is to be noted that step 204 is not required if the server S only performs the text-to-phoneme conversion for the character sequences in specific languages only. When the language is determined in the server S, greater resources of the server can be utilized and a successful selection of the language is highly probable.

The TBP converts 205 the character sequence into a phoneme sequence in accordance with the determined language. For example, the character sequence 'James Bond' can result in the phoneme sequence '/jh/ /ey/ /m/ /z/ /b/ /oh/ /n/ /d/'. The text-to-phoneme conversion is typically achieved using a look-up table or automatic text-to-phoneme mapping. Mapping is typically language-dependent, whereas look-up tables are always language-dependent; in other words, there are separate text-to-phoneme sources for different languages. The text-to-phoneme conversion can be performed using any technique, for example with lexicons using the HMM (Hidden Markov Model) technique, neural networks or decision trees. Publication 'SELF-ORGANIZING LETTER CODEBOOK FOR TEXT-TO-PHONEME NEURAL NETWORK MODEL' by Kåre Jean Jensen and Sren Riis presented in the $6^{th}$ International Conference on Spoken Language Processing (ICSLP), 16-20 Oct. 2000, Beijing, China, discloses one way of using neural networks, and publication 'DECISION TREE BASED TEXT-TO-PHONEME MAPPING FOR SPEECH RECOGNITION' by Janne Suontausta and Juha Häkkinen discloses one way to use decision trees. Because the memory capacity of the server S is not as limited as that of the electronic device TE, a technique can be selected that enables as accurate phoneme conversion as possible.

The server S sends 206 the phoneme sequence to the electronic device TE. In the electronic device, the phoneme sequence is stored 207 in the memory MEM (can also be a memory of a separate memory card or an IC card, attached to the device), associating the sequence to the original character sequence already stored in the memory MEM or its tag. For example, the phoneme sequence is attached to the name-tag of the contact details. When the speech recognition block SRB is active, speech information 208 received from the user via a microphone is compared 209 with the stored phoneme sequences. If a phoneme sequence substantially matching the speech information is found, the character sequence associated to it is selected 210 for a service. The character sequence can also be shown on the display of the user interface UI of the TE. After this, the service can be activated on the basis of the character sequence or the information further associated to it. If the TE is a mobile station, a typical service is selection of a name and a call set-up to the number associated to the name. The service can, however, involve performing a control command in an electronic device, for instance activating the keypad lock. Thus, the command can be modelled to a phoneme sequence and the user can control the electronic device TE with his/her speech. The service can also be determination of a text to the display from the user's speech to implement playback of automatic recognition of dictation. Some other examples of services include search of street addresses and city names on the basis of the speech in a navigation system or a database search on the basis of the name of the author.

The above-described steps 201 to 210 can be performed fully automatically, so that the user does not have to take any extra measures to implement speech recognition for the fed character sequences. The phoneme conversions can be stored for instance in the TE, which is for example a mobile station supporting the GSM standard, where contact details have, however, been stored on an IC card comprising a SIM (Subscriber Identity Module) application: if the user exchanges the IC card to a new mobile station, text-to-phoneme conversion can be automatically performed for the contact details of the IC card. If the data transmission between the server S and the TE causes costs for the user, for instance a fee for transmitting a short message in the public land mobile network PLMN, acceptance can be requested of the user prior to the transmission of the character sequence 202.

FIG. 3 shows a method according to a second preferred embodiment, where the selection of the language is performed in the electronic device TE. Preferably, the speech recognition block SRB comprises a language selector. The received 301 character sequence is fed to the language selector, and the language selector determines 302 the language in one of the ways described above in connection with step 204. After this, the TE sends 303 a character sequence and a language tag to the server S. The S (TPB) performs 305 text-to-phoneme conversion, and steps 306 to 310 can be performed in the way described above. It is also possible for the user to select 302 the language. This second embodiment brings about the advantage that settings of the electronic device can be used in the language selection (e.g. selecting the language of the user interface UI), or a language or the most probable languages suggested by the language selector can be offered for the user for selection.

In accordance with an embodiment of the invention, after the steps 203 and 204, the server S searches for information possibly related to the received character sequence in the memory SMEM or another network element, for instance the home location register (HLR) of the GSM network, or a contact list connected to the Internet. The S performs for instance a database search with the received character sequence as its search tag. Alternative telephone numbers (home number, mobile number, office number, facsimile) or e-mail addresses can be associated to the character sequence. The S sends the information, in addition to the phoneme sequence, 206 306 to the electronic device TE preferably by using the same message. Thus, additional information in the network can be easily sent to the electronic device without the user having to request for it separately. One or more phoneme sequences can also be formed 205, 305 of the additional information, and sent 206, 306. These phoneme sequences can be stored (207) with the information in the memory MEM of the electronic device. In this way, more information becomes easily available in the electronic device, the user being able to select information by means of speech. For instance, the character sequence 'Peter' originally sent can be supplemented with the work number found in the network, i.e. the character sequence 'Peter work' and a phoneme sequence of the character sequence 'Peter work'.

It is to be noted that the character sequence, for instance the name 'Peter' may be used in a plurality of languages, in which case several languages are obtained for the character sequence 204, 302. Thus, the TBP forms 205, 305 phoneme sequences on the basis of several languages, and all obtained phoneme sequences are sent 206 to the electronic device 206. The phoneme sequences can be automatically stored 207, 307 in the memory MEM, or the user can be requested to select/confirm the phoneme sequences before storing 207, 307.

Figure 4:
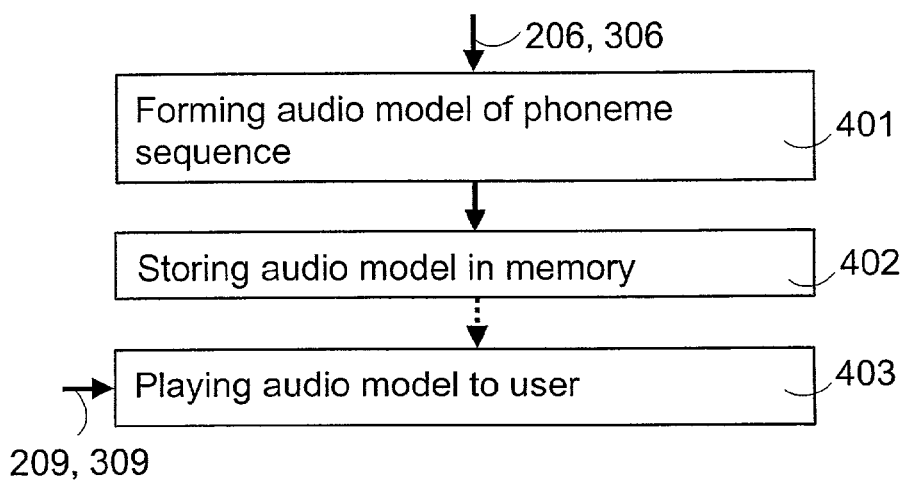
FIG. 4 shows a flow chart of an embodiment according to the invention, in which an audio model is formed.

FIG. 4 illustrates an embodiment according to which an audio model is formed 401 of the phoneme sequence received (206, 306) from the server S in an audio synthesizer of the electronic device TE. Since the audio model is language-dependent, the formation 401 of the audio model is performed in accordance with the determined language (204, 302). The audio model can be formed by means of a speech synthesis or by using audio models saved beforehand. The audio model is stored 402 in the memory MEM of the electronic device TE, associating it to the character sequence or its tag. The audio model is played 403 to the user of the electronic device if the speech information of the user substantially matches the phoneme sequence of the character sequence associated with the audio model, i.e. after step 209 or 309. The audio model can also be played to the user when it is received from the server S. If the user is provided with a character sequence selected on the basis of the speech recognition only on the display, the user must move the electronic device TE farther away from his/her ear to see the selected character sequence. Playing the audio model eliminates this drawback and provides the user with audio feedback, which further increases user convenience in speaker-independent speech recognition. This embodiment can be further utilized in such a way that the user can select one or more phoneme sequences (i.e. suggested pronunciation form) on the basis of several suggested audio models. The user can also reject the suggested pronunciation on the basis of the played audio model, whereby a new text-to-phoneme conversion can be performed in the network and a new phoneme sequence can be sent to the electronic device TE. In this way, speech recognition can be further improved.

In accordance with a preferred embodiment, the data transmission between the server S and the electronic device TE (mobile station) is attended to by messaging through a public land mobile network PLMN. Short messages of the short message service SMS are particularly suitable for transport of short text and phoneme sequences. The phoneme sequence is transmitted in text format. The S can be connected to the SMS message service SMS-SC, which transmits the short message data received from the TE and addressed to the server S to the server, to the I/O means SI/O, and vice versa. As regards more accurate description of the operation of the SMS service, the book '*The GSM System for Mobile Communications*' by M. Mouly and M. Pautet, Palaiseau, France 1992, ISBN:2-9507190-0-7, Chapter 8.3, is incorporated as reference herein. The data transmission can also be based on circuit-switched data calls or packet-switched data transmission services, for instance GPRS services or packet-switched data transmission services of the UMTS system. Also the wireless application protocol WAP can be used in the transfer of text and phoneme sequences.

It is obvious to a person skilled in the art that with the advance of technology, the basic idea of the invention can be implemented in a plurality of ways. Pronunciation can be modelled with not only phonemes but with other sequences of acoustic units as well. The invention and the embodiments thereof are thus not confined to the above-described examples but can vary within the scope of the claims.

The invention claimed is:

1. A method of forming a pronunciation model for speech recognition in a telecommunications system comprising at least one portable electronic device and a server, the electronic device being configured to compare the user's speech information with pronunciation models comprising acoustic units and stored in the electronic device, the method comprising:
    transferring a character sequence from the electronic device to the server, comparing the character sequence with a language resource to determine the language of the character sequence in a language selector of the electronic device,
    selecting a text to phenome resource, stored in the server, according to the determined language;
    converting the character sequence in the server into at least one phoneme sequence in text format in accordance with the determined language; and transferring said at least one phoneme sequence in text format from the server to the electronic device;
    storing the phoneme sequence in association with the transferred character sequence in the electronic device;
    forming an audio model of the phoneme sequence at the electronic device;
    storing the audio model in the electronic device in association with the character sequence; and
    comparing received speech information with the stored phoneme sequence and if a match results, selecting the character sequence associated with the matching phoneme sequence.

2. A method according to claim 1, the method further comprising:
    selecting a character sequence according to said phoneme sequence from contact information; and
    activating a service in accordance with said character sequence.

3. A method according to claim 1, the method further comprising:
    searching in the server for information related to the character sequence, e.g. telephone numbers, on the basis of the received character sequence; and
    sending said information in addition to the phoneme sequence to the electronic device.

4. A method according to claim 1, the method further comprising:
    playing the audio model to the user of the electronic device as a response to the user's speech command being substantially matching the phoneme sequence received from the character sequence.

5. A method according to claim 1, wherein the electronic device is a mobile station and the data transmission between the server and the electronic device is configured by messaging through a mobile network.

6. A method according to claim 1, wherein the language is determined by means of decision trees.

7. A telecommunications system comprising:
    at least one electronic device and a server, wherein the electronic device is configured to send a character sequence intended for speech recognition to the server;
    a language selector of the electronic device, adapted to compare the character sequence with a language resource to determine the language of the character sequence;
    wherein the server is configured to convert the character sequence into at least one phoneme sequence in accordance with the determined language and the server is configured to send said at least one phoneme sequence to the electronic device; wherein the electronic device is configured to form an audio model of the phoneme sequence and to store said audio model in association with the character sequence;
    a memory in the electronic device for storing the phoneme sequence in association with the transferred character sequence in the electronic device; and
    further wherein the electronic device is configured to compare the user's speech information with the stored phoneme sequences stored in the electronic device and if a match results, selecting the character sequence associated with the matching phoneme sequence.

8. An electronic device comprising:
    a language selector adapted to compare a character sequence with a language resource to determine a language of the character sequence intended for speech recognition;
    a transmitter adapted to send the character sequence intended for speech recognition and information on the language of the character sequence to a server;
    a receiver adapted to receive a phoneme sequence formed of the character sequence in accordance with the determined language from the server;
    a processor in the electronic device configured to form an audio model of the phoneme sequence and to store said audio model in association with said character sequence;
    a memory adapted to store the phoneme sequence in association with the character sequence; and
    wherein the processor is adapted to compare user's speech information with stored phoneme sequence and if a match results, select the character sequence associated with the matching phoneme sequence.

9. An electronic device according to claim 8, wherein the processor is further adapted to:
    associate a phoneme sequence received from the server to the character sequence stored in the memory of the electronic device or its tag;
    select a phoneme sequence substantially according to the user's speech information and further a character sequence according to said phoneme sequence; and
    activate a service in accordance with said character sequence.

10. An electronic device according to claim 8, wherein the language selector is arranged to determine the language by means of decision trees.

11. A server comprising:

a communication connection for receiving a character sequence from at least one electronic device;

a language selector adapted to compare the character sequence with a language resource to determine a language for the character sequence intended for speech recognition;

a processor for converting the character sequence into at least one phoneme sequence in accordance with the determined language; and wherein said processor is adapted to send the at least one phoneme sequence to the electronic device over the communication connection; and and wherein the phoneme sequence is received and further processed and stored in association with the character sequence in the electronic device; and wherein a processor in the electronic device is adapted to compare a user's speech information with the stored phoneme sequence and if a match results, select the character sequence associated with the matching phoneme sequence; and further wherein the processor in the electronic device is configured to form a audio model of the phoneme sequence and to store said speech model in association with the character sequence.

12. A server according to claim 11, wherein the language selector is arranged to determine the language by means of decision trees.

13. A computer program product comprising a computer readable program code stored in a memory for causing a computer to perform speech recognition, said computer program product further comprising:

computer readable program code means for causing a computer server to receive a character sequence for speech recognition from an electronic device;

computer readable program code means for causing the computer server to compare the character sequence with a language resource to determine a language of the character sequence;

computer readable program code means for causing the computer server to convert the character sequence into at least one phoneme sequence in text format in accordance with the determined language; and computer readable program code means for causing a processor in said electronic device to receive the at least one phoneme sequence in text format from the server;

computer readable program code means for causing the processor to store the phoneme sequence in association with the character sequence; and compare received speech information with the stored phoneme sequence and, if a match results, select the character sequence associated with the matching phoneme sequence; and computer readable program code means for causing the processor to form a audio model of the phoneme sequence and to store said speech model in association with the character sequence.

* * * * *